US012285048B2

(12) United States Patent
Ihns et al.

(10) Patent No.: US 12,285,048 B2
(45) Date of Patent: Apr. 29, 2025

(54) VAPORIZER CARTRIDGE WITH NON-CONDUCTIVE BASE

(71) Applicant: AMP Innovations Inc., Warrington, PA (US)

(72) Inventors: Samuel Ihns, Cambridge, MA (US); Michael Tarkanian, West Roxbury, MA (US); Nicholas Sih, Naples, FL (US); Sophie Longawa, Dana Point, CA (US)

(73) Assignee: AMP Innovations Inc.

(*) Notice: Subject to any disclaimer, the term of this patent is extended or adjusted under 35 U.S.C. 154(b) by 0 days.

(21) Appl. No.: 18/232,069

(22) Filed: Aug. 9, 2023

(65) Prior Publication Data

US 2024/0049789 A1 Feb. 15, 2024

Related U.S. Application Data

(60) Provisional application No. 63/396,624, filed on Aug. 10, 2022, provisional application No. 63/453,235, filed on Mar. 20, 2023.

(51) Int. Cl.

| | |
|---|---|
| ***A24F 40/42*** | (2020.01) |
| ***A24F 7/02*** | (2006.01) |
| ***A24F 40/10*** | (2020.01) |
| ***A24F 40/46*** | (2020.01) |
| ***A24F 40/485*** | (2020.01) |
| ***H05B 3/06*** | (2006.01) |

(52) U.S. Cl.

CPC ................ *A24F 40/42* (2020.01); *A24F 7/02* (2013.01); *A24F 40/10* (2020.01); *A24F 40/46* (2020.01); *A24F 40/485* (2020.01); *H05B 3/06* (2013.01); *H05B 2203/007* (2013.01); *H05B 2203/021* (2013.01)

(58) Field of Classification Search

CPC .......... A24F 40/42; A24F 40/10; A24F 40/46; A24F 40/40; A24F 7/02; B05B 3/06

See application file for complete search history.

(56) References Cited

U.S. PATENT DOCUMENTS

2016/0309785 A1* 10/2016 Holtz ..................... B65D 53/04
2018/0027879 A1* 2/2018 Gavrielov ............. A24F 40/485
(Continued)

OTHER PUBLICATIONS

PCT International Search Report and Written Opinion, PCT Application No. PCT/IB2023/058075, Nov. 15, 2023, 9 pages.

*Primary Examiner* — Hae Moon Hyeon
(74) *Attorney, Agent, or Firm* — Fenwick & West LLP

(57) ABSTRACT

A vaporizer cartridge includes a non-conductive base that has a top end, a bottom end, and an exterior side surface. The exterior side surface is at least partially threaded to enable the bottom end to screw into a battery unit. The vaporizer cartridge also includes a body with a bottom end coupled to the top end of the non-conductive base. The body includes a cavity configured to store a vaporizable liquid. A vaporization chamber that is fluidly coupled to the cavity includes a heating element for heating liquid, causing the liquid to vaporize. The heating element has first and second electrical ends that are electrically coupled to the terminals of a battery when the cartridge is screwed into the battery unit. The first and second ends of the heating element are coupled to the terminals by first and second connectors, respectively.

18 Claims, 13 Drawing Sheets

(56) References Cited

U.S. PATENT DOCUMENTS

| | | | | |
|---|---|---|---|---|
| 2019/0104764 | A1* | 4/2019 | Tucker | H05B 3/42 |
| 2019/0373954 | A1* | 12/2019 | Rado | A24F 40/485 |
| 2020/0390149 | A1 | 12/2020 | Hepworth et al. | |
| 2020/0404966 | A1 | 12/2020 | Pohl et al. | |
| 2020/0404968 | A1 | 12/2020 | Rogan | |
| 2021/0000183 | A1 | 1/2021 | Davis et al. | |
| 2021/0112875 | A1* | 4/2021 | Liao | A24F 40/42 |
| 2021/0401064 | A1 | 12/2021 | Verleur et al. | |
| 2022/0361575 | A1* | 11/2022 | Chen | A24F 40/10 |
| 2023/0329346 | A1* | 10/2023 | Ou | A24F 40/40 |

* cited by examiner

VAPORIZER CARTRIDGE WITH NON-CONDUCTIVE BASE

CROSS REFERENCE TO RELATED APPLICATIONS

This application claims the benefit of U.S. Provisional Application Nos. 63/396,624, filed Aug. 10, 2022, and 63/453,235, filed Mar. 20, 2023, both of which are incorporated by reference.

BACKGROUND

1. Technical Field

The subject matter described relates generally to vaporizer and cartridges and, in particular, to vaporizer cartridges with non-conductive threads that are compatible with existing vaporizers and batteries.

2. Background Information

A vaporizer is a device that is used to vaporize a substance for inhalation. A common type of vaporizer is a "vape pen" that includes an elongate body similar to a pen in appearance into which cartridges that hold a liquid solution to be vaporized are inserted. A heating element heats the liquid solution, causing it to vaporize and enabling the user to inhale the vapor. Once the liquid solution has been fully vaporized, the user can remove and replace the cartridge. Empty cartridges may be refilled or discarded.

Existing cartridges used in many vaporizers, referred to as 510 cartridges, are relatively expensive to manufacture. Current designs include significant metal portions that have to be molded or machined to specific dimensions. Specifically, existing 510 cartridges include a metal base that screws into the vaporizer and also provides an electrical connection between a heating element in the cartridge and a battery unit in the body of the vaporizer. As a result of the high cost of production, manufacturing of cartridges has largely been taken offshore to reduce costs. One downside of this offshoring is that the countries in which production occurs often have lower safety standards or safety standards that are not consistently enforced. Consequently, there have been numerous examples of users being harmed due to toxins being released into the vapor from cartridges manufactured using unsafe materials. There is thus a need for safe cartridges that can be consistently manufactured at lower cost.

SUMMARY

The above and other problems may be addressed by a vaporizer cartridge that has a base made from a non-conductive material. The electrical connection between the heating element and the battery unit may be provided by small, conductive elements that can be attached to the non-conductive base. In this disclosure, non-conductive should be understood to mean that the material has sufficient resistance that the battery does not short and sufficient current flows through the conductive elements that the heating element reaches a temperature sufficient to cause a target amount of vaporization. This can significantly reduce the cost of manufacture of the cartridge. Additionally or alternatively, the vaporizer cartridge may include other improvements, including a liquid stopper that prevents unvaporized liquid from leaking out of the cartridge, a plunger that pushes liquid towards the heating element reducing the amount of wasted liquid that does not get vaporized, or a snap-fit mouthpiece that can connect with the cartridge to make a reliable seal without the need for a gasket or o-ring.

In one embodiment, a vaporizer cartridge includes a non-conductive base that has a top end, a bottom end, and an exterior side surface. The exterior side surface is at least partially threaded to enable the bottom end to screw into a battery unit. The vaporizer cartridge also includes a body with a bottom end coupled to the top end of the non-conductive base. The body includes a cavity configured to store a vaporizable liquid. A vaporization chamber that is fluidly coupled to the cavity includes a heating element for heating liquid, causing it to vaporize. The heating element has first and second electrical ends that are electrically coupled to the terminals of a battery when the cartridge is screwed into the battery unit. The first and second ends of the heating element are coupled to the terminals by first and second connectors, respectively.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise. Note that the figures are not necessarily to scale. Rather, the figures have been drafted to clearly illustrate the relevant principles. Similarly, the figures may omit various elements or features where inclusion of those elements or features would not help clarify the principle being illustrated.

Figure 1A:
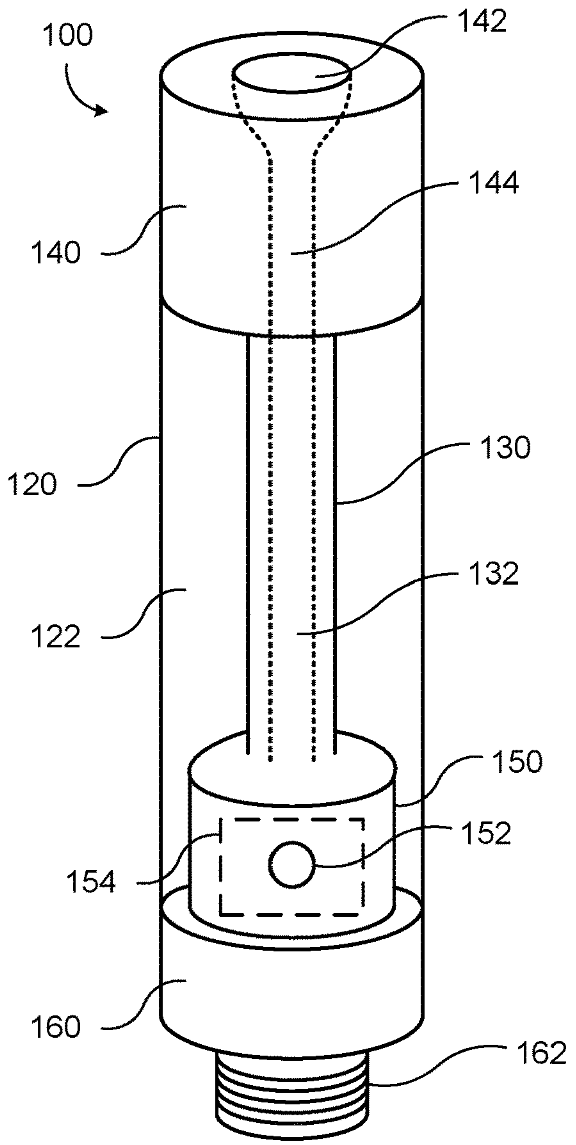
FIGS. 1A and 1B illustrate the general structure of a vaporizer cartridge.
Figure 1B:
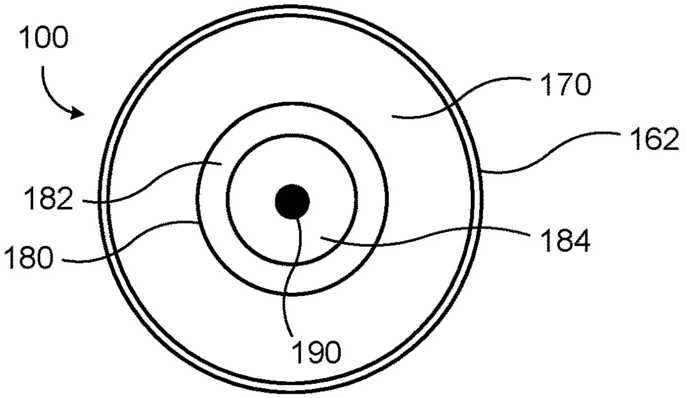

FIGS. 1A and 1B illustrate the general structure of an example 510-type vaporizer cartridge 100. Specifically, FIG. 1A shows a side perspective view of the cartridge 100 and FIG. 1B shows a bottom view of the cartridge 100. The cartridge 100 includes a body 120 with a cavity 122 inside for holding the liquid to be vaporized. The body 120 of the cartridge includes a vaporization chamber 150 that is fluidly coupled to the cavity 122 (e.g., via one or more holes 152 in the vaporization chamber). A heating element 154 sits within the vaporization chamber 150 to heat liquid that enters the vaporization chamber 150, causing it to vaporize. For example, the heating element may be a resistive heating element, such as a metallic coil or ceramic element.

The body 120 also includes a column 130 that defines a channel 132 through which vapor generated in the vaporization chamber 150 can move to the top end of the body 120, where a mouthpiece 140 is attached. The mouthpiece 140 includes at least one hole 142 through which the user may suck to draw vapor through the channel 132, into a corresponding channel 144 in the mouthpiece 140, and into the user's mouth. Although the channel 144 in the mouthpiece 140 is shown to have the same diameter as the channel 132 in the column 130, this need not be the case. A wide range of fluid connections between the vaporization chamber 150 and the hole 142 in the mouthpiece 140 may be used. Furthermore, although the mouthpiece is described as being separate from the body 120, in some embodiments they may be formed as a single piece.

A base 160 is attached to the bottom end of the body 120. The base includes a threaded portion 162 that screws into the vaporizer device. In a conventional 510-type cartridge, the base 160, including the threaded portion 162, is made from a conductive material (e.g., a metal such as steel) and also serves as a first electrical connection between the heating element 154 and a battery (e.g., a connection to the negative terminal of the battery). The second electrical connection (e.g., to the positive terminal of the battery) may be provided by a structure 180 in the bottom of the base 160, as can be seen in FIG. 1B.

FIG. 1B illustrates the bottom of the base 160 of the cartridge 100. The threaded portion 162 of the base 160 encompasses an annular recess 170. Inside the recess 170 there is a two-tiered raised structure 180 with a first annular surface 182 that is closer to the base of the recess 170 than a second annular surface 184 that sits within the first annular surface 182. The two-tiered raised structure 180 may provide the second electrical connection when a pin (that is connected to the battery) is inserted in a hole 190 in the second annular surface 184. The two-tiered raised structure 180 and hole 190 may aid in aligning the pin when the cartridge 100 is screwed in, ensuring a good electrical connection between the heating element 154 and the battery. The recess 170 may be partially or completely lined with a non-conductive material to prevent shorts between the first and second electrical connections.

Figure 2:
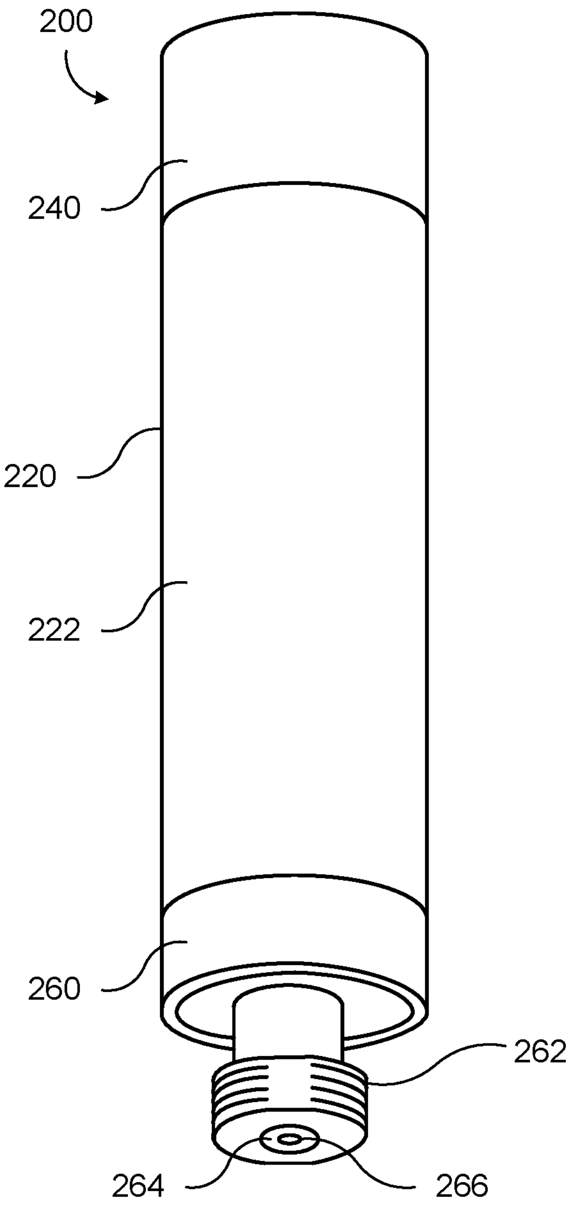
FIG. 2 illustrates a vaporizer cartridge with a non-conductive base, according to one embodiment.

FIG. 2 illustrates one embodiment of a cartridge 200 that has a non-conductive threaded portion 262 for screwing the cartridge into a vaporizer device. The cartridge 200 includes a body 220 having a cavity 222 within it for storing liquid to be vaporized. The body 220 includes various other components, such as a heating element 154 and column 130, but these are omitted for clarity. A mouthpiece 240 may be integral with or connected to the top end of the body 220.

The threaded portion 262 of the cartridge is made from a non-conductive material, such as an injection-moldable polymer. To provide power to the heating element 154, a first electrical connection is provided by a ring 260 of conductive material (e.g., stainless steel) that is placed around the bottom end of the body 220 and a second electrical connection is provided by an electrode 264 of conductive material on the bottom of the threaded portion 262 of the cartridge base. The electrode 264 may define or surround a hole 266 that receives a pin that is connected to the battery, thus providing a reliable electrical connection. In another embodiment, the first electrical connection need not be provided by a ring 260. Other shapes of connector that may be affixed to an otherwise non-conductive portion of the cartridge 200 and provide an electrical contact with the battery may be used.

FIGS. 3A through 3D illustrate how a cartridge may be constructed using primarily inexpensive, non-conductive, injection-moldable plastic, with small amounts of a conductive material being used to provide electrical connections between the battery and heating element 154. In the embodiments shown, the body 300 of the cartridge is formed from a pair of injection molded pieces, but larger numbers of injection molded pieces may be combined to form the cartridge. Similarly, although the illustrated embodiment has the two halves formed such that the connecting seams run vertically along the long axis of the cartridge, other orientations and positions of seam could be used. Alternatively, the body 300 may be formed from a single injection molded piece.

Figure 3A:
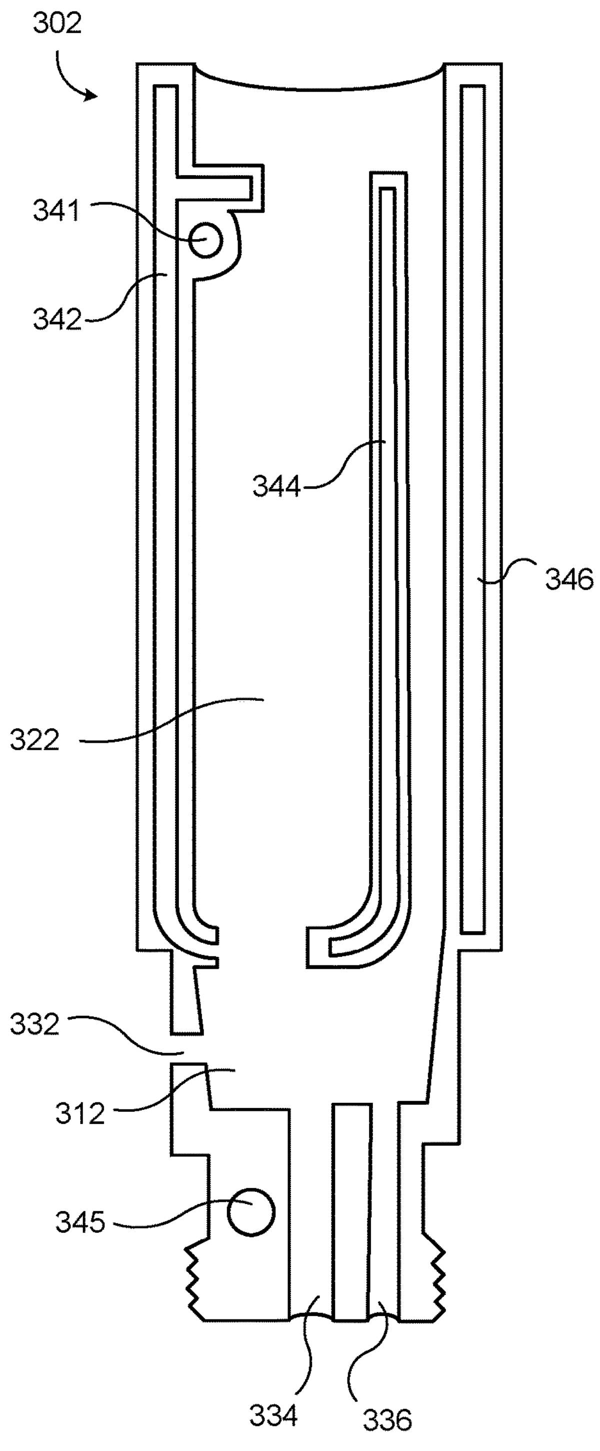
FIG. 3A through 3D illustrate a vaporizer cartridge manufactured using injection molding, according to one embodiment.
Figure 3B:
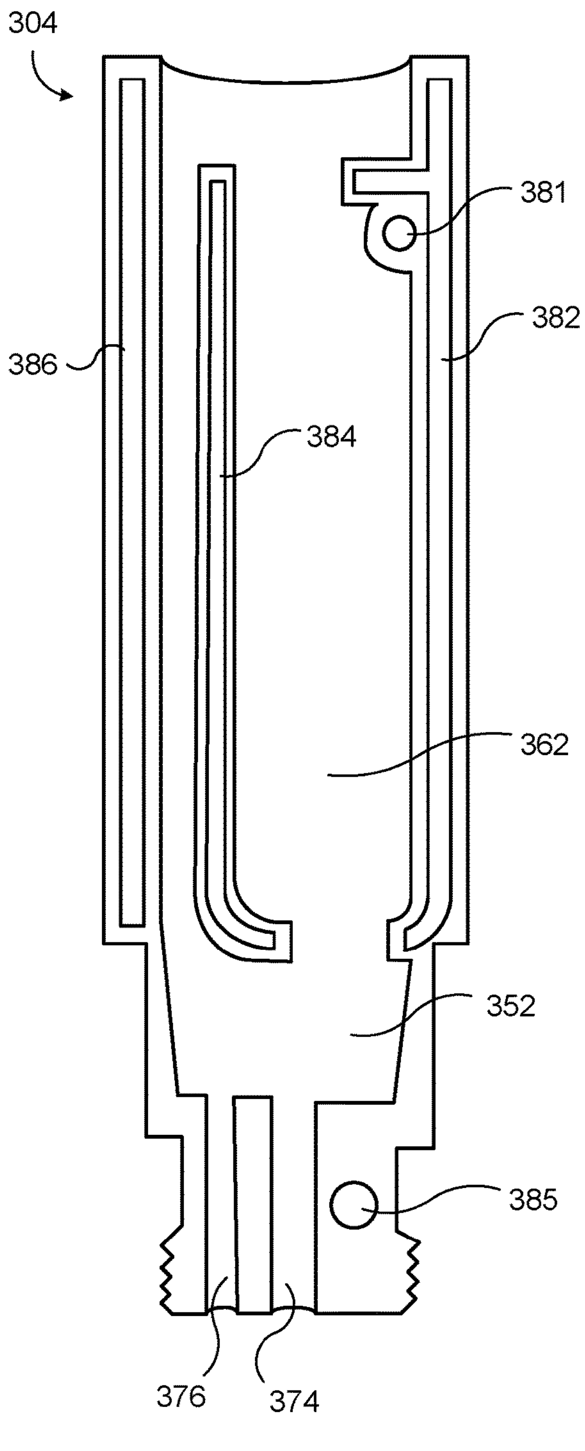

FIG. 3A illustrates a first part 302 of the cartridge body 300 and FIG. 3B illustrates a second part 304 of the cartridge body 300. In the embodiment shown, the first part 302 includes a set of depressions that receive corresponding protrusions from the second part 304 to aid in alignment and connection of the two halves. For example, the first part 302 includes a first slot 342, a second slot 344, and a third slot 346, which respectively receive a first flange 382, a second flange 384, and a third flange 386 of the second part 304. Similarly, the first part 302 includes a first hole 341 and a second hole 345 that respectively receive a first pin 381 and a second pin 385 of the second part 304.

The parts may be formed from any suitable injection-moldable material, such as polycarbonate or high-density polyethylene (HDPE). The parts may be connected in various ways, such as using heat shrink plastic wrap, mechanical clamping, press fits, snap fits, screws, nuts and bolts, welded seams (e.g., using ultrasonic, chemical, or thermal welding, etc.), or any other suitable approaches. An advantage of heat-shrink sealing is that the heat shrink can be custom printed for branding, graphics, etc. Where ultrasonic welding is used, the parts can be designed with energy directors, which focus the energy from the ultrasound to join parts of the injection molded components. This can be done with a manual operator or with an automated system. In one embodiment, the energy directors are triangular elements with sixty-degree side angles and 0.3 mm side length.

When the first part 302 and the second part 304 are connected, first and second cavities are formed. Specifically, recessed region 312 of the first part 302 combines with recessed region 352 of the second part 304 to form the first cavity. The first cavity is configured to hold a heating element 154 (which typically will be inserted before the two parts are connected). Similarly, recessed region 322 of the first part 302 and recessed region 362 of the second part 304 combine to define the second cavity, which is configured to hold the liquid to be vaporized.

The first cavity includes several openings to the exterior of the body 300 of the cartridge. Specifically, the first part 302 includes a hole 332 in one side that is configured for a first electrical connector to pass through. Additionally or alternatively, a hole for the first electrical connector may be included in the side of the second part 304. A first channel out of the bottom of the cartridge body 300 is defined by recess 334 of the first part 302 and recess 374 of the second part. A second channel out of the bottom of the cartridge body 300 is defined by recess 336 in the first part 302 and recess 376 in the second part 304. The first channel is configured to enable a second electrical connector to pass through. The second channel provides an air intake into cavities within the cartridge body. Although the air intake is shown in the end of the base of the body, the air intake may be located on other surfaces of the body, such as in the side (e.g., opposite of next to the hole 332).

Figure 3C:
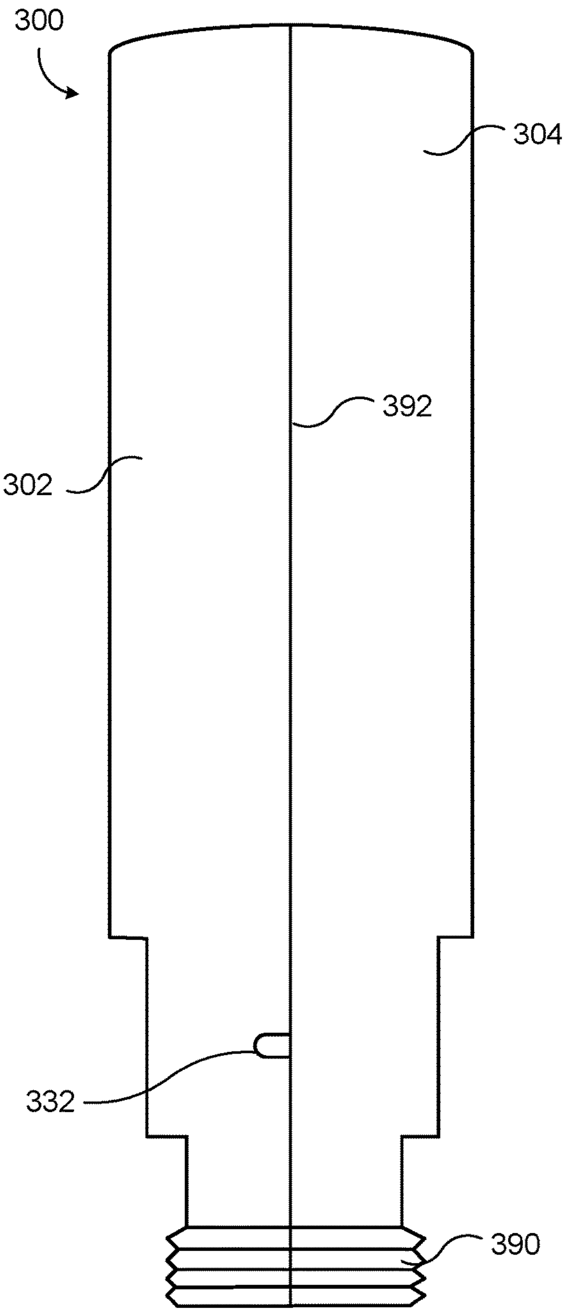
Figure 3D:
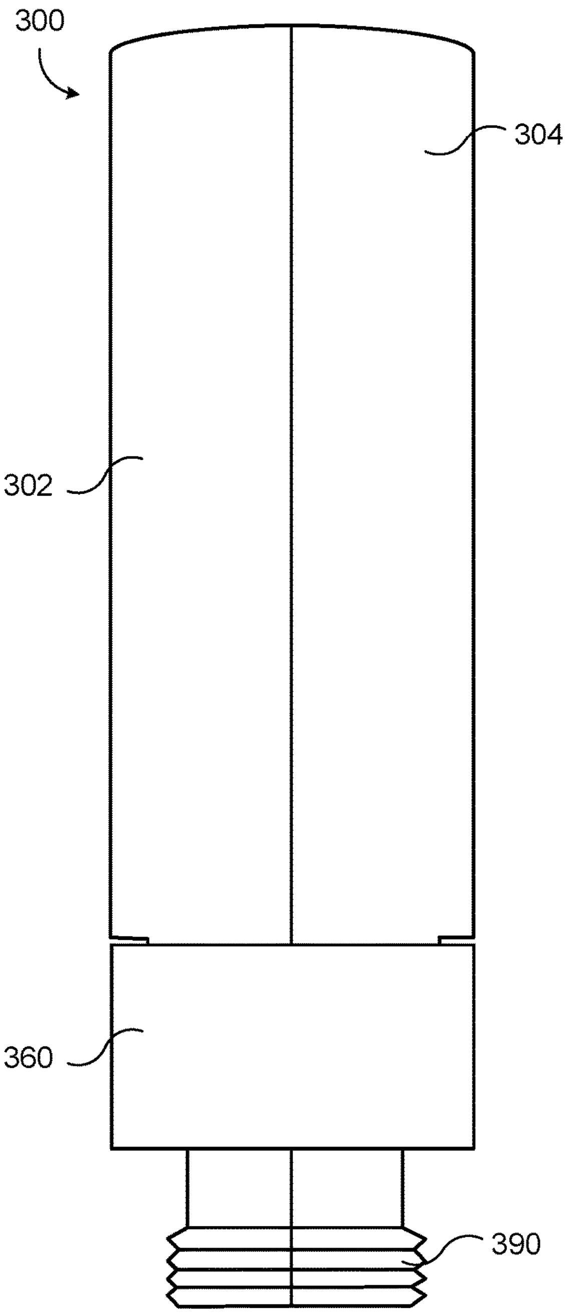

FIG. 3C illustrates the body 300 of the cartridge formed by connecting the first part 302 and the second part 304. One seam 392 where the parts have been joined is visible (with the other seam being on the other side of the body). The hole 332 for the first electrical connector is visible at the seam 392. Once joined, the two parts provide a threaded portion 390 at the base of the body 300 that may screw into the battery. FIG. 3D illustrates that a conductive component (e.g., a conductive ring 360) may be attached to the bottom of the body 300, covering the hole 332. As described previously, when the body 300 is screwed into the battery, connection between the battery and the heating element 154 may be provided by a first electrical connector that passes through the hole 332, connecting with conductive ring, that provides electrical contact with a terminal of the battery, and a second electrical connector that passes through the bottom of the body 300 (e.g., through the first channel or the second channel) to provide electrical contact with a second terminal of the battery.

A mouthpiece may be pressed, snapped, threaded, or otherwise joined into the top of the body 300, before or after joining the pieces together. The addition of a separate mouthpiece allows for the cartridge to be filled according to current industry practice. Alternatively, the mouthpiece may be included in the body that is injection molded, with the cartridge filled through a port in the mouthpiece or side of the body 300.

In other embodiments, rather than using conductive elements that are inserted into or attached to a non-conductive cartridge body, some or all of the cartridge may be formed from an injection-moldable conductive material. For example, the threaded base may be formed from a conductive injection-moldable plastic providing a first electrical contact and the second electrical contact may be provided through a pin in the base of the cartridge (e.g., as shown in FIG. 1B). This pin is electrically isolated from the first electrical contact. Another example is using metal injection molding, a process in which finely-powdered metal mixed with binder is "feedstock" for injection molding. The molding process allows high volume, complex parts to be shaped in a single step. After molding, the part undergoes conditioning operations to remove the binder (debinding) and densify the powders into a non-porous part via sintering.

Figure 4A:
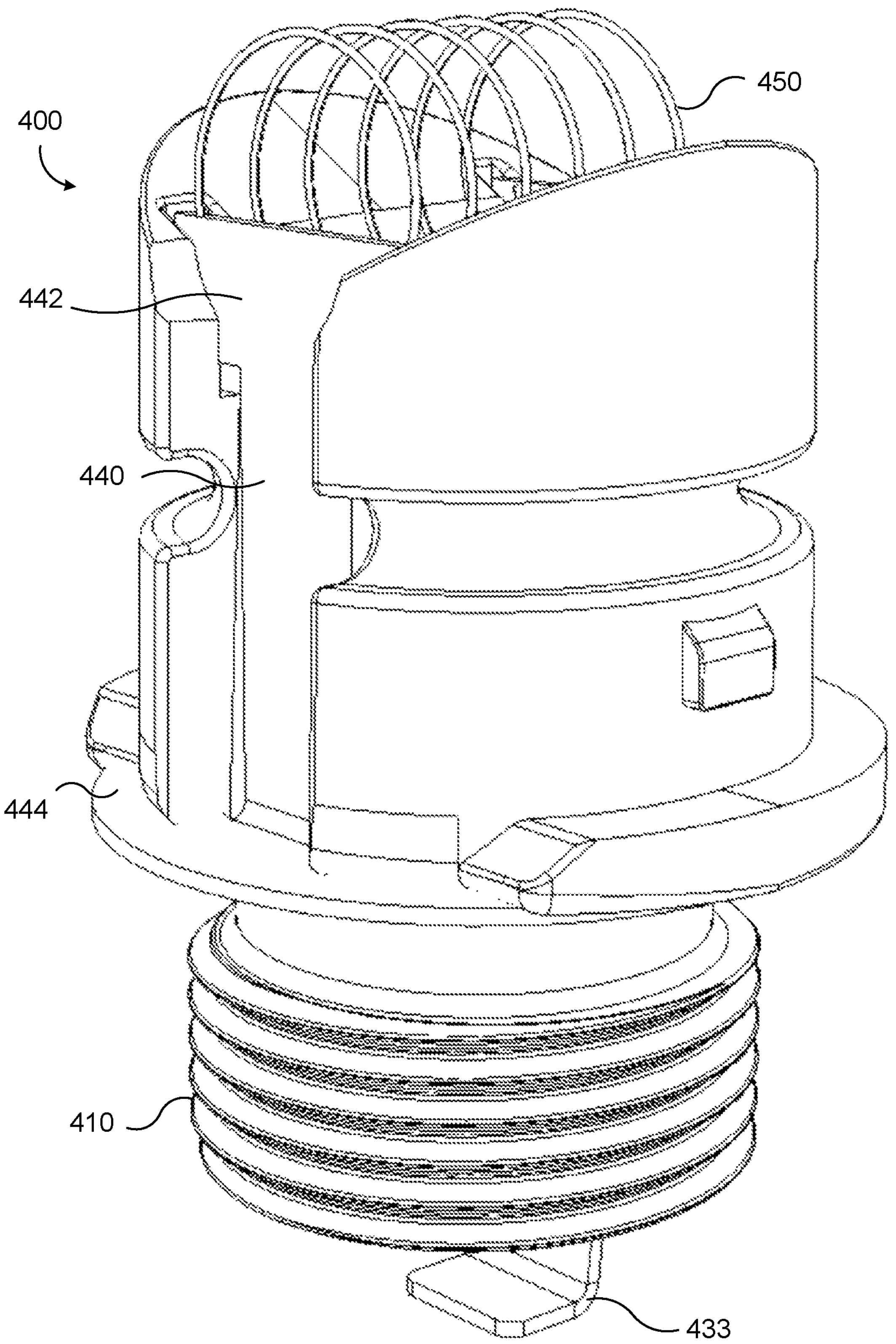
FIG. 4A illustrates a vaporizer cartridge with a non-conductive base and two metal clip electrical terminals, according to one embodiment.
Figure 4B:
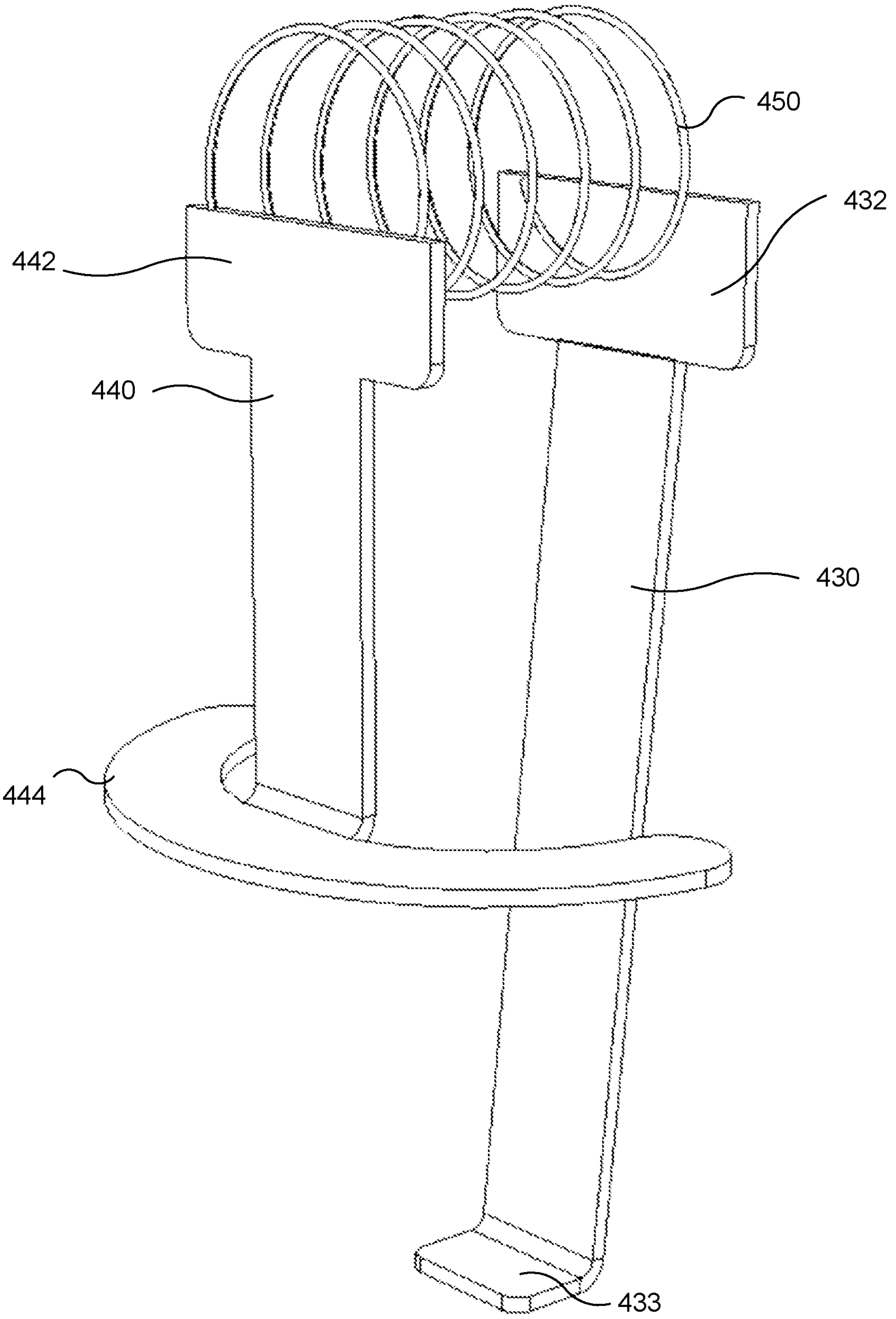
FIG. 4B illustrates the two metal clip electrical terminals and heating element within the base of the vaporizer cartridge of FIG. 4A, according to one embodiment.

FIGS. 4A and 4B illustrate an alternative embodiment in which a pair of conductive clips are used with a non-conductive threaded base portion 410. The lack of a conductive base may be overcome with direct electrical connections to the battery. An injection-molded or otherwise non-conductive base 400 may be designed to accommodate electrodes that are routed through the non-conductive base to make contact with the positive and negative battery terminals.

As shown in FIGS. 4A and 4B, the base 400 of the cartridge incorporates a heating coil 450. The heating coil 450 is connected to a first conductive clip 430 on one end and a second conductive clip 440 on the other end. For example, a first tab 432 at the top of the first conductive clip 430 may be spot welded to one end of the heating coil 450 while a second tab 442 at the top of the second conductive clip 440 may similarly be spot welded to the other end of the heating coil 450. As well as providing a surface to which the heating coil 450 is spot welded, the tabs 432, 442 may also slot into grooves in the base 400 to help lock the clips in place. References to an "end" of the heating coil 450 mean one of the two ends of the coil to which the positive and negative terminals of the battery are connected.

In one embodiment, the first conductive clip 430 extends down through the inside of the base 400, ending in a foot 433 that contacts a terminal of the battery when the cartridge 400 is screwed into the battery. In contrast, the second conductive clip 440 extends down the outside of the base 400 (e.g., through a groove or channel) and ends in a partial annulus 444 that contacts the other terminal of the battery when the cartridge 400 is screwed into the battery. One or both ends of the partial annulus 444 may engage with slots or holes in the base 400 to provide additional stability holding the second clip 440 in place. It should be appreciated that a wide range of clip shapes and designs may be used so long as the clips are held in place when connected to the base 400 in a position where they contact the respective terminals of the battery when the cartridge 400 is screwed in using the threaded portion 410 of the base.

Figure 5:
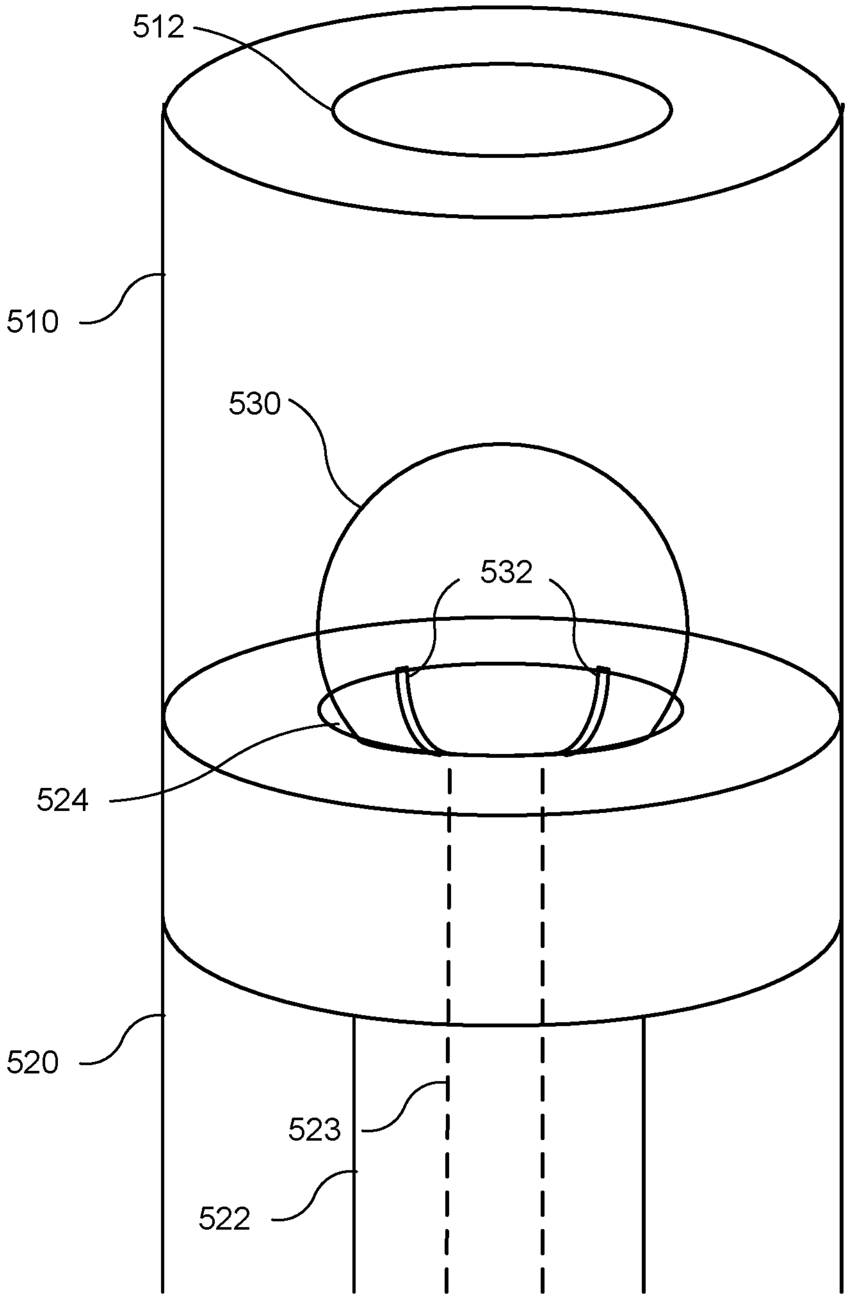
FIG. 5 illustrates a vaporizer cartridge with a liquid stopper that prevents leakage, according to one embodiment.

FIG. 5 illustrates an example embodiment of a stopper 530 that can prevent or reduce leakage from a cartridge. In the embodiment shown, a mouthpiece 510 is connected to the top of the body 520 of the cartridge. Vapor passes through a channel 523 in a central column 522 within the body, through an opening 524 at the top of the channel 523 into the mouthpiece 510, and ultimately out of a hole 512 in the mouthpiece 510 (e.g., when the user inhales with the mouthpiece 510 in their mouth). The stopper 530 sits in the opening 524. In one embodiment, the stopper 530 is fixed in place and leaves gaps (e.g., due to grooves 532) that are large enough for the vapor to pass through but small enough that viscosity and/or surface tension prevents unvaporized liquid passing the stopper. Additionally or alternatively, the stopper 530 may be appropriately sized and weighted such that it moves (e.g., lifts upwards) due to the suction provided by the user via the mouthpiece 510, allowing vapor to pass through the opening 524, with the stopper 530 falling back into place when the suction stops. Although the stopper is shown as a sphere, a wide range of geometric configurations of the opening 524 and stopper 530 may be used that prevent liquid from entering the mouthpiece 510 while allowing vapor to pass around the stopper 530. For example, a flat sheet that completely blocks the opening 524 at rest that lifts up when the user inhales may be used. As another example, a fine mesh may be placed over the opening 524 that prevents most or all liquid flow through the opening 524 but does not significantly impede vapor from entering the mouthpiece.

Figure 6:
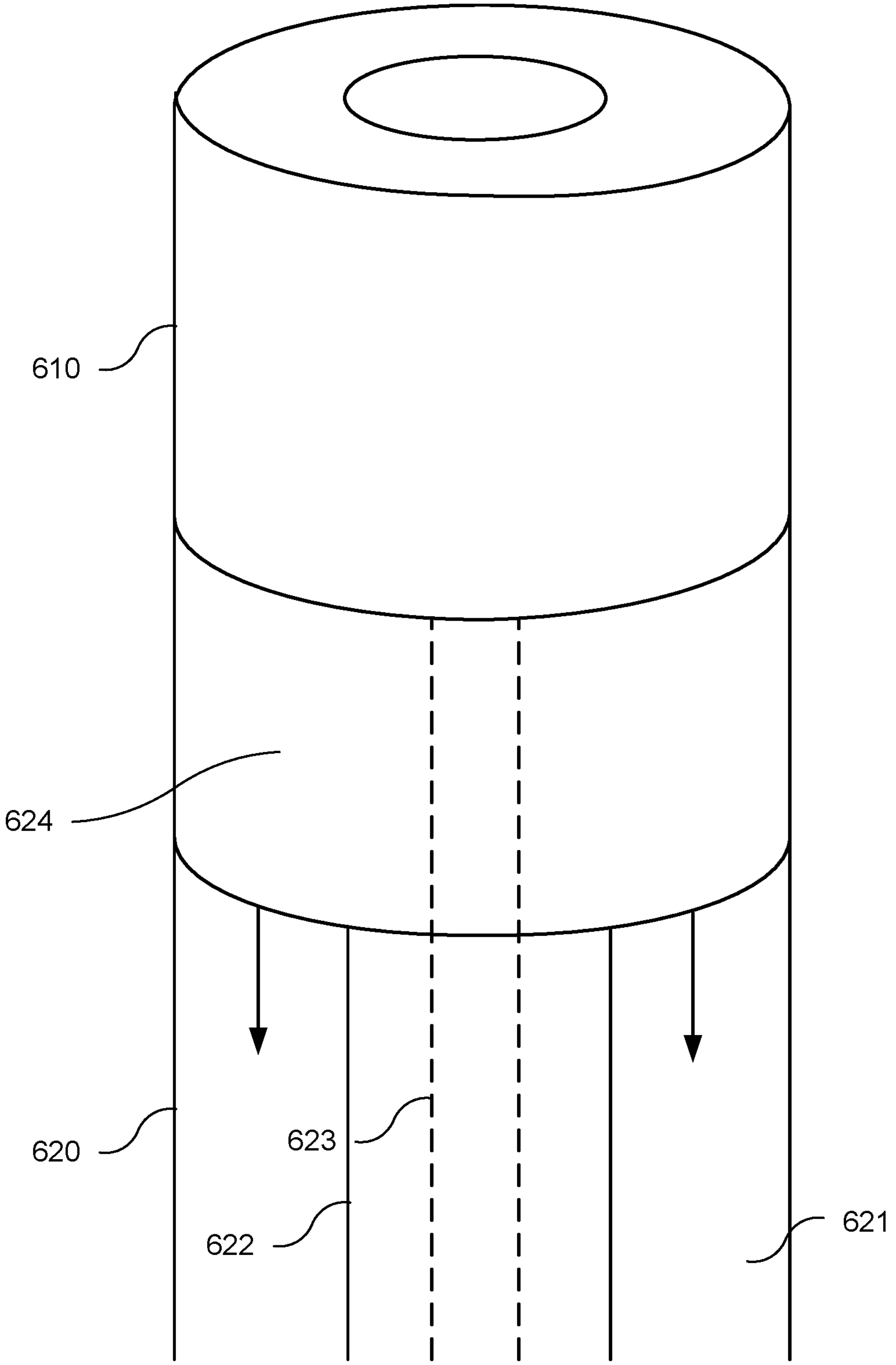
FIG. 6 illustrates a vaporizer cartridge with a plunger for pushing liquid towards the heating element, according to one embodiment.

FIG. 6 illustrates an example embodiment of a plunger 624 that pushes liquid in the cartridge towards the heating element. In the embodiment shown, a mouthpiece 610 is connected to the top of the body 620 of the cartridge. Vapor passes up a channel 623 in a central column 622 within the body 620 and into the mouthpiece 610. The space within the body 620 around the central column 622 includes a cavity 621 for storing unvaporized liquid. A plunger 624 is placed on top of the unvaporized liquid in the cavity to push it down towards the heating element to be vaporized. In one embodiment, the plunger 624 provides pressure on the liquid in the cavity 621 via a hydraulic locking mechanism. In another embodiment, the plunger 624 is made from a closed-cell foam that expands as liquid is vaporized, applying pressure on the liquid in the cavity 621.

Figure 7A:
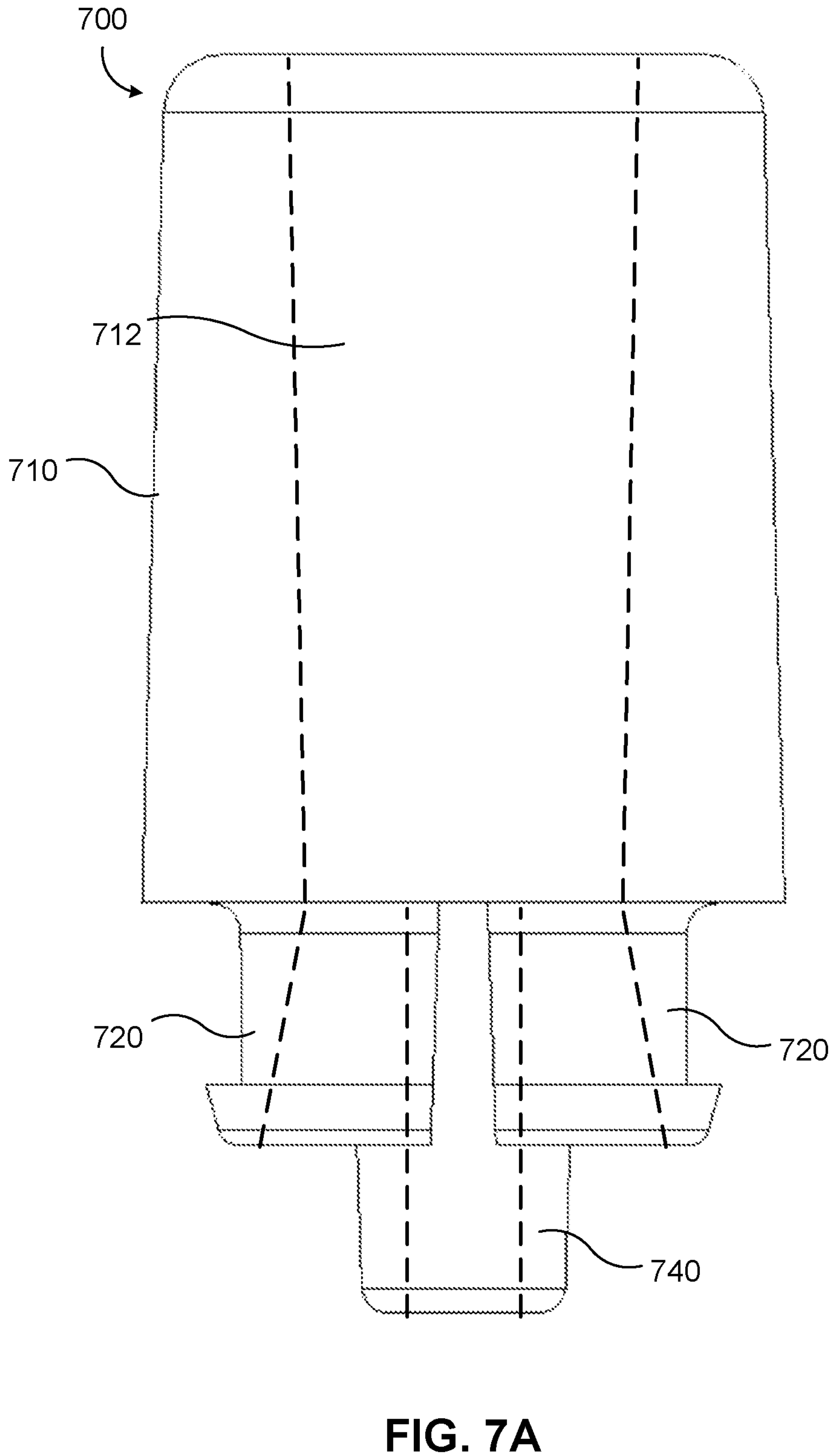
FIG. 7A is a view of a first side of a snap-fit mouthpiece, according to one embodiment.
Figure 7B:
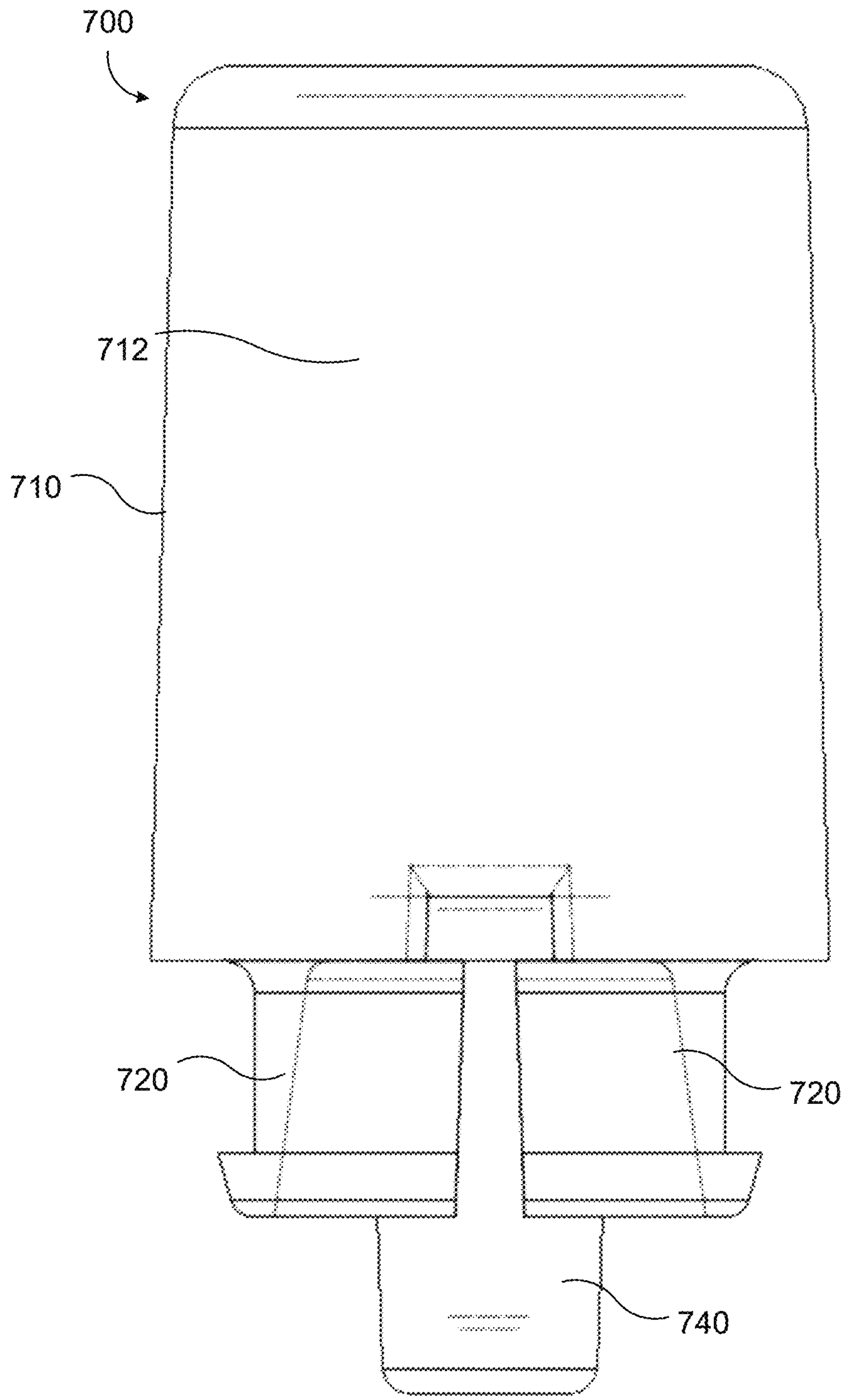
FIG. 7B is a view of another side (e.g., opposite the first side) of the snap-fit mouthpiece of FIG. 7A, according to one embodiment.
Figure 7C:
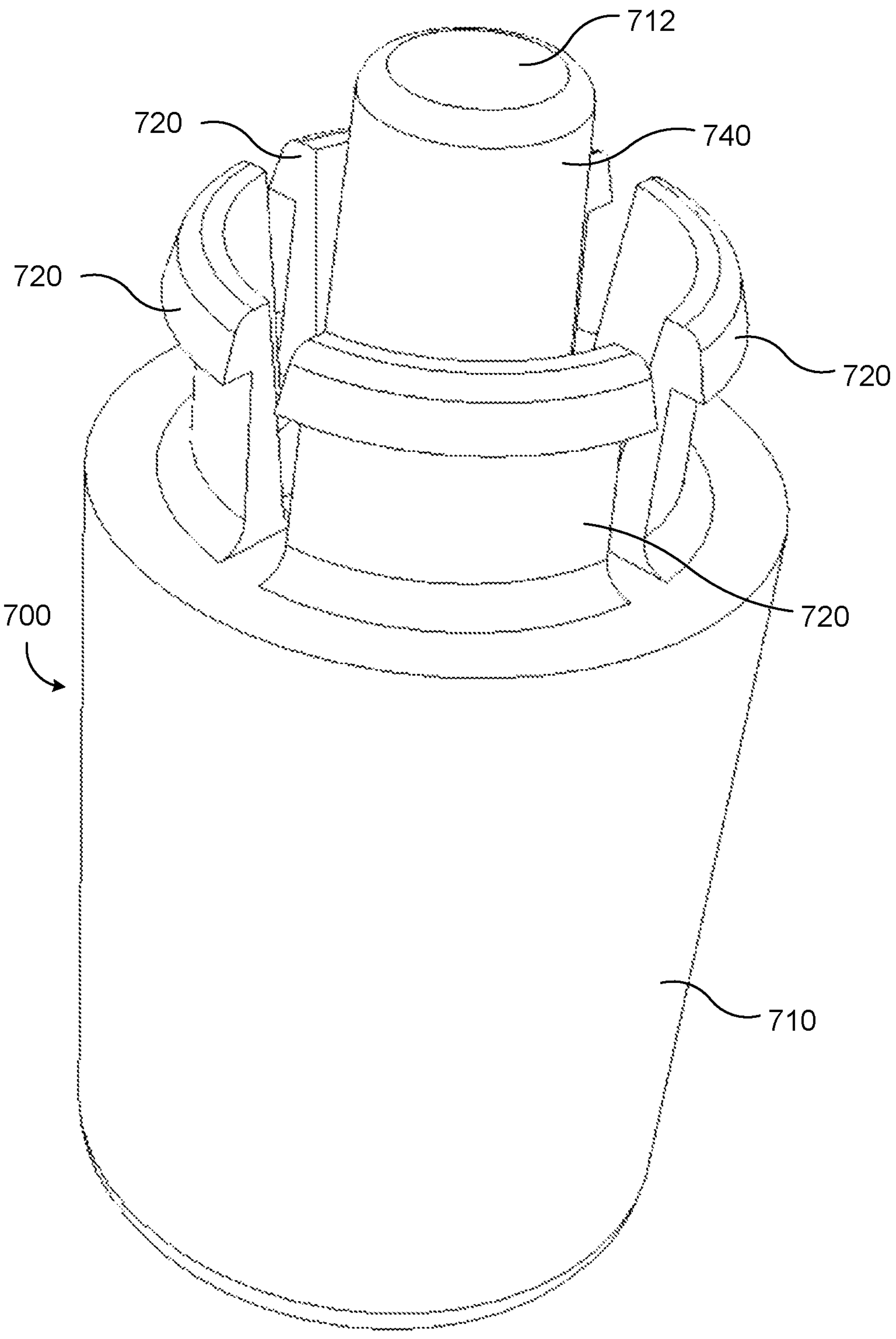
FIG. 7C is a perspective view of the snap-fit mouthpiece of FIG. 7A, according to one embodiment.

FIGS. 7A through 7C illustrate one example embodiment of a snap-fit mouthpiece 700. The snap-fit mouthpiece 700 may be injection molded or formed using any other suitable technique. In the embodiment shown, the body 710 is shaped for convenience of a user to provide suction, drawings vapor through a channel 712 that passes through the body. Two or more (e.g., four) barbs 720 are attached around the periphery of body 710 of the mouthpiece 700. These barbs 720 extend away from the body 710 at the end opposite to the one that the user puts in their mouth. The barbs 720 may press fit or otherwise engage with a slot or slots (e.g., an annular ring) injection molded into the body of the cartridge. The flexible barbs 720 may provide stress relief during the press-fit, so that that joined halves of the cartridge body are not over-stressed and prone to failure. Similarly, the use of multiple barbs 720 (e.g., rather than a single, annular connector) allows the barbs 720 to flex on insertion into the body of the cartridge, reducing the likelihood of the barbs breaking as well.

An approximately cylindrical connector 740 is attached to the bottom of the mouthpiece 700. The connector 740 is described as approximately cylindrical as it tapers as it extends away from the body 710 in approximately the same direction as the barbs 720. When the mouthpiece 700 is connected to a cartridge, the connector 740 forms an interference fit with the hole in the top of the body (e.g., through which the cartridge is filled and vapor leaves the cartridge), which prevents the leakage of vapor or fluid around the mouthpiece 700 rather than through the channel 712 within it. This seal can be achieved without using a gasket or o-ring.

Figure 8:
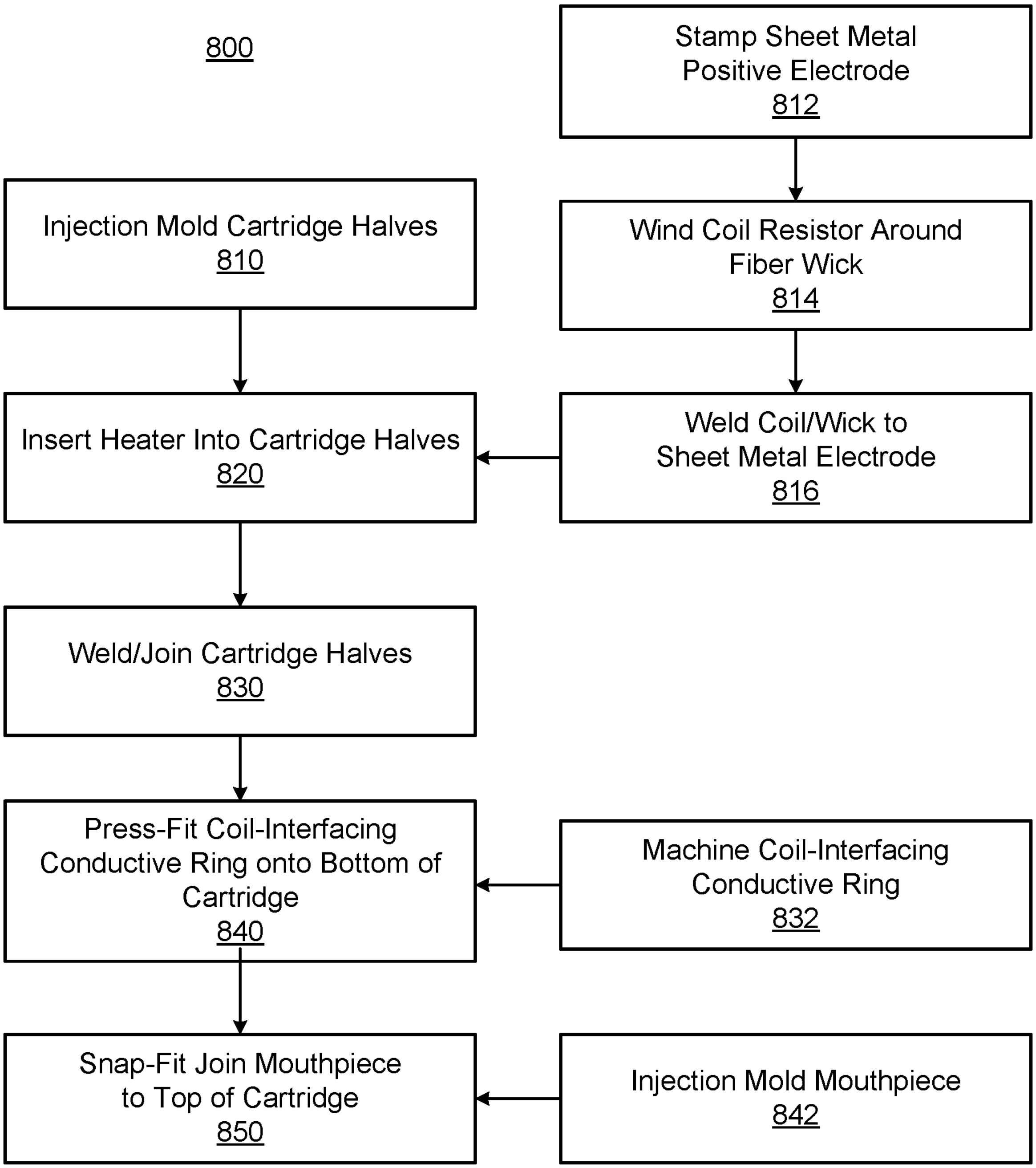
FIG. 8 is a flowchart of a process for manufacturing a vaporizer cartridge, according to one embodiment.
Figure 9:
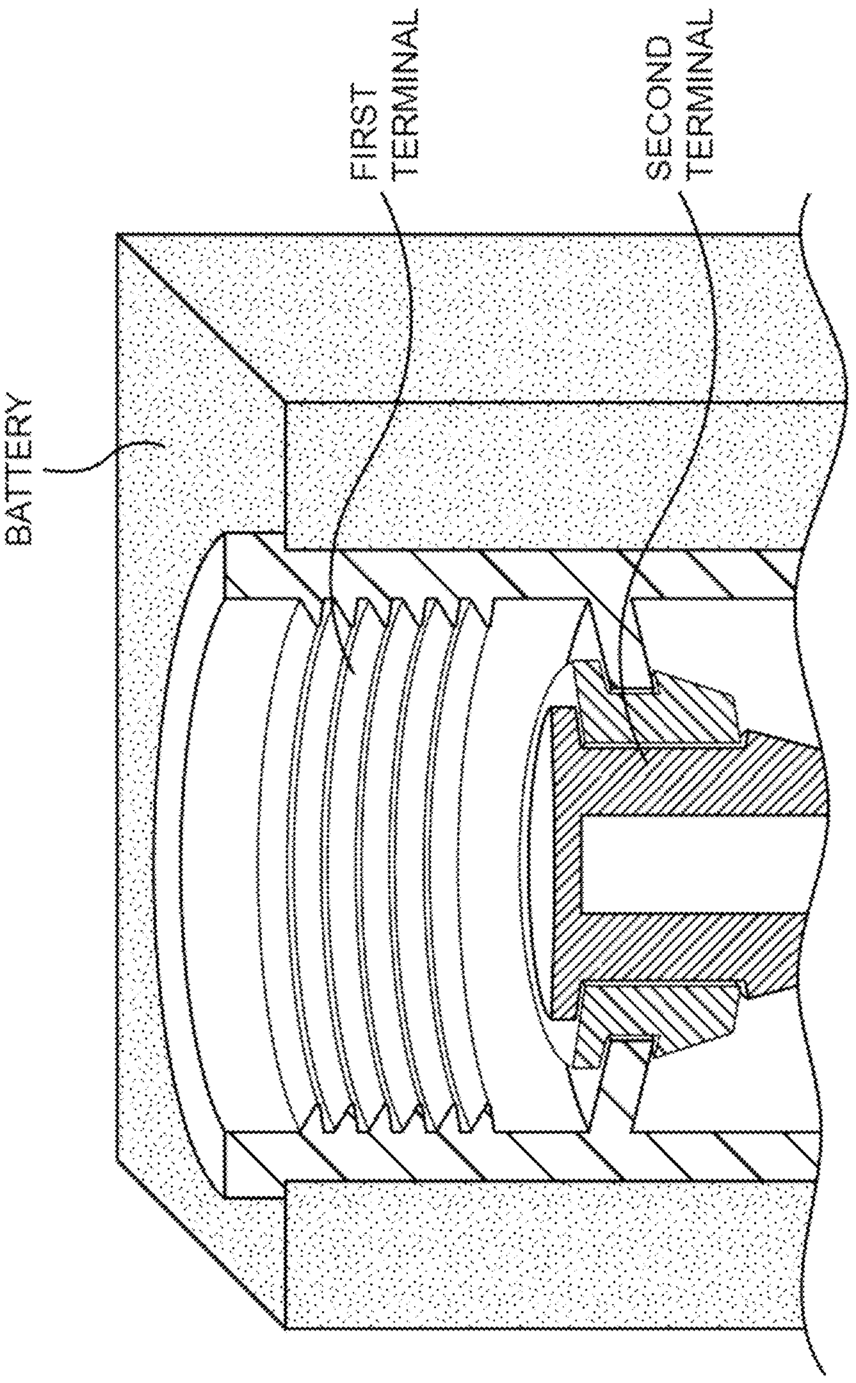
FIG. 9 (Prior Art)
FIG. 9 illustrates a prior art battery with a standard 510 connector.

FIG. 8 illustrates a process 800 for manufacturing a vaporizer cartridge, according to one embodiment. The steps of FIG. 8 are shown as being performed in a particular order. However, in some embodiments, some steps may be performed in a different order or in parallel. In addition, some embodiments may include different or additional steps.

In the embodiment shown, the process 800 begins by injection molding 810 a pair of cartridge body halves. For example, the cartridge body halves may be those illustrated in FIGS. 3A and 3B. The heater is inserted 820 into one of the cartridge body halves. The heater may have been formed by stamping 812 a sheet metal positive electrode, winding 814 a coil resistor around a fiber wick, and welding 816 the coil/wick to the sheet metal electrode. The cartridge body halves are then placed together (e.g., using one or more pairs of protrusions and depressions for alignment) and joined 830 together (e.g., using an acoustic welding process).

The process 800 continues by press-fitting 840 a conductive ring onto the bottom of the cartridge body. The conductive ring may have been produced by machining 832 the conductive ring from a larger piece of conductive material (e.g., stainless steel). A mouthpiece, such as the one shown in FIG. 7, may be joined 850 (e.g., using a snap-fit) to the top of the cartridge body. The mouthpiece may have been formed 842 by injection molding or any other suitable technique.

Based on the foregoing, it should be appreciated that the disclosed cartridges may be produced inexpensively relative to existing cartridge designs. Furthermore, additional features such as the liquid stopper, plunger, and snap-fit mouthpiece may be included to provide improved functionality over existing cartridges.

ADDITIONAL CONSIDERATIONS

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process providing vaporization cartridges with non-conductive bases. Thus, while particular embodiments and applications have been illustrated and described, it is to be understood that the described subject matter is not limited to the precise construction and components disclosed. The scope of protection should be limited only by the following claims.

What is claimed is:

1. A vaporizer cartridge comprising:

a non-conductive base having an exterior side surface, a bottom end, and a top end, the exterior side surface being at least partially threaded to enable the bottom end to screw into a battery unit;

a body having a bottom end coupled to the top end of the non-conductive base, the body including a cavity configured to store a vaporizable liquid;

a vaporization chamber, fluidly coupled to the cavity;

a heating element, disposed within the vaporization chamber, having a first electrical end and a second electrical end, the heating element configured to heat liquid within the vaporization chamber causing the liquid to vaporize;

a first connector, electrically coupled to the first electrical end of the heating element, configured to contact a first terminal of the battery unit responsive to the bottom end of the non-conductive base being screwed into the battery unit; and a second connector, electrically coupled to the second electrical end of the heating element, configured to contact a second terminal of the battery unit responsive to the bottom end of the non-conductive base being screwed into the battery unit.

2. The vaporizer cartridge of claim 1, wherein the non-conductive base and the body are formed from a plurality of injection molded pieces.

3. The vaporizer cartridge of claim 1, wherein the plurality of injection molded pieces are made from polycarbonate or HDPE.

4. The vaporizer cartridge of claim 1, wherein the first connector comprises:

a first conductive element, electrically coupled to the first electrical end of the heating element, that passes through a hole in the exterior side surface of the non-conductive base; and a second conductive element, attached to the exterior side surface of the non-conductive base, and in electronic contact with the first conductive element, wherein the second conductive element is electrically coupled to first terminal of the battery unit responsive to the bottom end of the non-conductive base being screwed into the battery unit.

5. The vaporizer cartridge of claim 4, wherein the second conductive element comprises a conductive ring slid over the non-conductive base.

6. The vaporizer cartridge of claim 1, wherein the second connector contacts the second terminal of the battery at the bottom end of the non-conductive base.

7. The vaporizer cartridge of claim 1, wherein:

the first connector comprises a first conductive clip that passes through an interior of the non-conductive base to the bottom end of the non-conductive base; and the second connector comprises a second conductive clip that extends along at least part of the exterior side surface of the non-conductive base.

8. The vaporizer cartridge of claim 7, wherein the first conductive clip comprises:

a tab at a first end, the tab being joined to the first electrical end of the heating element; and a foot at a second end, opposite the first end, the foot contacting the first terminal of the battery unit at the bottom end of the non-conductive base.

9. The vaporizer cartridge of claim 7, wherein the second conductive clip comprises:

a tab at a first end, the tab being joined to the second electrical end of the heating element; and at least a partial annulus at a second end, opposite the first end, the partial annulus wrapping around a portion of the exterior side surface of the non-conductive base.

10. The vaporizer cartridge of claim 1, wherein the heating element comprises a metallic coil or ceramic element.

11. The vaporizer cartridge of claim 1, further comprising:

a column, within the body, the column including a first channel that fluidly couples the vaporization chamber to an opening at a top end of the body, the top end of the body being opposite the bottom end of the body; and a mouthpiece, coupled to the top end of the body, the mouthpiece including a second channel fluidly coupling the opening at the top end of the body to a hole through which a user may inhale vapor.

12. The vaporizer cartridge of claim 11, further comprising a liquid stopper that prevents unvaporized liquid from entering the second channel from the first channel while allowing vapor to enter the second channel from the first channel.

13. The vaporizer cartridge of claim 11, wherein the liquid stopper is fixed in place and includes one or more surface features that define gaps that are large enough for vapor to pass through but small enough to prevent the unvaporized liquid passing through.

14. The vaporizer cartridge of claim 11, wherein the liquid stopper moves to enable vapor to pass from the first channel to the second channel responsive to the user applying suction to the hole in the mouthpiece.

15. The vaporizer cartridge of claim 11, wherein the mouthpiece comprises a plurality of barbs that snap into one or more corresponding slots in the body.

16. The vaporizer cartridge of claim 12, wherein the mouthpiece further comprises a connector that creates an interference fit with the opening in the top end of the body when the barbs are snapped into the one or more corresponding slots.

17. The vaporizer cartridge of claim 1, further comprising a plunger configured to push vaporizable liquid in the cavity towards the vaporization chamber.

18. The vaporizer cartridge of claim 17, wherein the plunger comprises a closed-cell foam that expands as liquid is vaporized.

* * * * *